Figure 1:
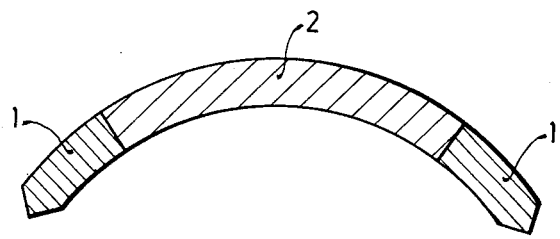

United States Patent [19]

Odor et al.

[11] 4,110,718
[45] Aug. 29, 1978

[54] MAGNETIC STRUCTURE, PARTICULARLY PERMANENT MAGNET FOR MOTOR FIELDS, AND METHOD

[75] Inventors: Frank Odor, Bietigheim; Adolf Mohr, Bühlertal; Klaus Bolenz, Bühl, all of Fed. Rep. of Germany

[73] Assignee: Robert Bosch GmbH, Stuttgart, Fed. Rep. of Germany

[21] Appl. No.: 618,574

[22] Filed: Oct. 1, 1975

[30] Foreign Application Priority Data

Jun. 20, 1975 [DE] Fed. Rep. of Germany ....... 2527461

[51] Int. Cl.² ............................................. H01F 1/08
[52] U.S. Cl. ................................... 335/296; 310/154; 335/302
[58] Field of Search ...................... 252/62.83; 335/296, 335/304, 306, 302; 310/154, 156, 258; 315/209; 320/57

[56] References Cited

U.S. PATENT DOCUMENTS

| | | | |
|---|---|---|---|
| 2,048,161 | 7/1936 | Klaiber | 310/154 |
| 3,535,200 | 10/1970 | Bergstom | 335/302 |
| 3,594,599 | 7/1971 | West | 310/258 |
| 3,808,514 | 4/1974 | Wesemeyer | 320/57 X |
| 3,894,525 | 7/1975 | Haubner | 315/209 X |

*Primary Examiner*—Harold Broome
*Attorney, Agent, or Firm*—Flynn & Frishauf

[57] ABSTRACT

To provide a magnet which has both the qualities of high remanence, or retentivity and coercive force, and is resistant to demagnetizing fields, the magnet is made in at least two zones of which the central or segmental zone is made of a magnetic material which has high remanence, whereas the end zone, or zones, is made of a magnetic material having high coercive force. This composite structure can be made by, for example, sequentially squeezing the different materials, in paste form, in a mold and then removing water, pressing, sintering and grinding the resulting structure.

17 Claims, 3 Drawing Figures

MAGNETIC STRUCTURE, PARTICULARLY PERMANENT MAGNET FOR MOTOR FIELDS, AND METHOD

The present invention relates to an anisotropic magnet structure, and more particularly to a composite magnet structure suitable for use as a field in dynamo electro machines, and to a method of its manufacture. Such magnets customarily consist of barium ferrites, or strontium ferrites.

It is difficult to find a suitable compromise regarding highest possible magnetic flux and highest coercive force, or coercivity when using anisotropic segmental magnets made of ferrites in dynamo electric machines, particularly of small or even miniature size. High coercivity is desirable to avoid demagnetizing effects in operation of motors. The danger of demagnetization is particularly acute at the end portions of the magnets, typically segmental elements, and is especially pronounced when such machines are started at low temperatures. Permanent magnets based on ferrites, as heretofore proposed, were made based on a compromise in which a certain predetermined design coercive force was associated with the highest possible remanence. Simultaneous increase of retentivity, or remanence and coercive force beyond customary values was not possible when using ferrite-based materials.

It is an object of the present invention to provide a magnet structure, particularly a segmental-type magnet which, as a whole, has remanence and high coercivity and which, additionally, at maximum flux density can be constructed to have a minimum volume. By minimum volume is meant that, based on a predetermined surface area, the thickness can be as small as possible, so that such magnets can be used in dynamo electric machine structures which are improvments with respect to power-weight ratio, dimensions of magnets, operating noise, and resistance to demagnetizing effects. These magnets should, additionally, be inexpensive and permit use of existing manufacturing apparatus for oriented oxide magnets. These magnets should be useful in field structures, for example as permanent magnet rotors in brushless motors, or other dynamo electric machines.

SUBJECT MATTER OF THE PRESENT INVENTION

Briefly, the magnet structure is a composite having zones of ferrite material which differ from each other, the different ferrite materials having different magnet properties. The ferrite materials are so selected that one material has highest remanence $B_r$; the other material has the highest coercivity $_jH_c$. If the composite magnetic structure is to be used as a rotary field, then, preferably, the end portions of a segmental arc, particularly the trailing end, is made of the ferrite material which has the highest coercivity. The magnet may be a composite of various elements in which each such element covers a zone, having uniform magnetic properties throughout the zone. The magnet may, however, also be a unitary structure when finished, so that various zones merge into each other without gaps or joints. The gaps or junction zones should, preferably, extend radially. The distribution of the zones may be symmetrical with respect to the center of rotation of the rotor magnet structure; it may, however, be unsymmetrical with respect to zone distribution. Unsymmetrical arrangement permits maximizing flux. In such an arrangement, only the trailing end—in which "trailing" is taken with respect to direction of rotation—is formed of the material with high coercivity. That portion of the segmental arc of the magnet which covers the major segmental zone, as well as the leading end is made of material of high remanence, or retentivity. The particular material covering a particular zone can be indicated at the outside of the magnet by an engraved or pressed-in index, notch, or paint marking, for example at a facing surface of the magnet structure.

It will usually be sufficient to construct the magnet of two ferrite materials having different magnetic properties, so that it will have at least two different zones. One of these zones is the major portion of the segmental arc as well as the leading end thereof and is constructed of the material having the highest retentivity $B_r$. The trailing end is located in a zone made of a ferrite material having highest coercivity $_jH_c$. The magnet may, however, also be constructed of three or more ferrite materials having different properties; preferably, the zones in which these different materials are located should be so arranged with respect to each other that the magnetic properties merge one, with respect to the other, in the direction of movement with respect to another element, and as desired.

The method of making such a magnet—in accordance with a feature of the invention—includes providing a ferrite mass of high remanence material in paste form, and a ferrite mass of high coercivity in paste form. The pasty ferrite materials are then injected by means of injection nozzles through injection ducts into mold forms. The material having high coercivity is introduced to the end, or ends, of the segmental arc, and the material of high remanence is introduced in the central portion of the segmental arc. The molded structure is then dehydrated in known manner, pressed, oriented, sintered, and ground. In accordance with an important feature of the invention, the injection steps are carried out in time-staggered procedures; the material of high coercivity is first injected into one (or both) segmental end(s), and the material of high remanence is thereafter injected into the remaining space between the ends, or from one end to the already injected other material.

Figure 2:
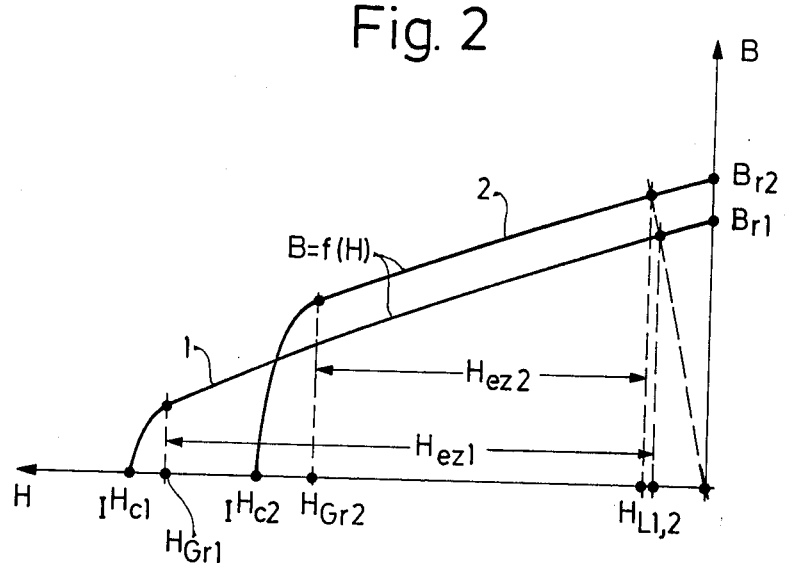
Figure 3:
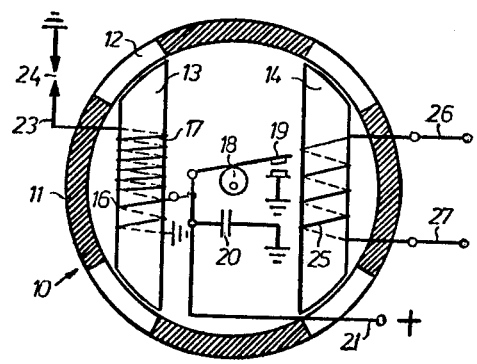

The invention will be described by way of example with reference to the accompanying drawings, wherein:

FIG. 1 is a highly schematic side view of a segmental magnet made of two ferrite materials;

FIG. 2 is a graph showing the demagnetizing curves for the materials of FIG. 1; and FIG. 3 is a schematic illustration of a magneto in which the magnet of the present invention can be used, and forming part of FIG. 1 of U.S. Pat. No. 3,808,514, assigned to the assignee of the present application.

The magnet segment of FIG. 1 is made of the two ferrite materials 1, 2. Material 1 forms the end zones; material 2 forms the major portion of the segmental arc. It is understood that, of course, the leading (with respect to direction of rotation) end zone may also consist of the material 2. As clearly seen in FIG. 2, the material 1 has higher coercivity than the material 2 ($_jH_{c1} > _jH_{c2}$). The remanence of the material 2, however, is higher than that of material 1 ($B_{r2} > B_{r1}$). The higher coercivity or coercive field strength of the material 1 resists the demagnetizing fields which are particularly applicable at the ends of the segmental magnet; the higher remanence or retentivity of material 2 provides for highest possible flux density.

The magnetic characteristics of the various magnetic materials can be suitably selected, or matched to the motor; the relative ratio of materials used, that is, the relative volume of material 1 or 2, can also be particularly adapted to the specific use and requirements of the motor so that, on the one hand, highest possible flux density is obtained while, on the other, highest resistance against demagnetizing effects with smallest possible volume of the magnet can be achieved.

The field in the motor has to resist demagnetization due to the quadrature field derived from the armature. This quadrature field affects the field structure of the magnet differently throughout its circumferential extent; it linearly increases from the middle of the magnet towards the trailing edge. Any particular magnetic material can be subjected to a certain maximum demagnetizing field without it becoming irreversibly demagnetized. This maximum field $H_{ez}$ depends on the demagnetizing flux $H_L$ in the air gap of the motor, and the maximum field strength $H_{Gr}$ which is at the knee of the function $B = f(H)$. $H_{ez}$ increases with higher values of $H_{Gr}$ and with decrease in $H_L$.

Increasing the maximum field strength $H_{Gr}$ is possible only with consequent decrease of the retentivity $B_r$, due to the predetermined inherent energy characteristics of the ferrite material. Thus, the materials inherently are different in flux density, and in capability to resist demagnetizing fields. If the two values—flux density and hence retentivity $B_r$ and coercivity $_jH_c$—are to be maximized, then it is necessary that each one of the materials is completely loaded with the highest demagnetizing field strength $H_{ez}$ to which it can be subjected.

It can be demonstrated that, when two ferrite materials 1, 2 are used, the maximum permissible demagnetizing fields $H_{ez1}$ and $H_{ez2}$ are in a predetermined relationship to the volumetric portion V of the respective materials used in the magnet. The optimum conditions are determined by relationship (1). A similar relationship can be derived for more than two ferrite materials.

The optimum conditions, defined by relationship (1), permit optimization of the volumetric portions of the magnet corresponding to its use, with respect to a demagnetizing field.

If the air gap relationships are given, then equations (2) and (3) will be applicable; as a first approximation, relationship (4) will apply, in which relationship (5) defines $V_{Ges}$. Since, as previously indicated, relationships (5a) and (5b) are applicable, material 1 is defined as the high coercive force material, and material 2 is defined as the high remanence material; these terms, of course, only indicate the relative relationships of the characteristics of the materials 1, 2, with respect to each other. Substituting this definition in equation (4), relationship (6) is obtained, in which the index R relates to the high remanence material, the index K to the high coercive force material and V represents volume. The volumetric proportions of the materials, for symmetrical construction of the magnet, is then derived from equation (7). If a magnetic construction is selected which has high coercive force only at one end, that is, at the trailing end of the magnet, then the volumetric portion $V_R$ is increased to $V_R'$, and relationships (7a) and (8) will be valid. Substituting equation (8) in equations (6), or (7), respectively, results in relationships (9), or (10), respectively.

Example of making a magnet segment in accordance with the invention: Two strontium ferrite materials are used, each one of which results in a sintered magnet, having the following characteristics:

Material 1: $_jH_c = 320\ kA/m,\ B_r = 350\ mT$

Material 2: $_jH_c = 256\ kA/m;\ B_r = 380\ mT.$

Ferrites having these characteristics are known, and can be prepared in accordance with technology known in the art.

Substances 1 and 2 are separately prepared, as usual, in known manner, in paste from containing about 23% water. An injection pump is used to inject the materials in a mold through various injection ducts. The injection duct for the high coercive force material terminates at one, or both ends of the magnet segment; the injection duct for the high remanent mass terminates at the crown or top position of the segment of the magnet. The volumetric proportion of the high remanence material $V_R$ can be determined from the above equation (7) to be 0.8 $V_{Ges}$, that is 80% of the entire volume of the magnet must consist of a high remanence substance, so that the magnet will have optimum shape and characteristics. The injection ducts are correspondingly designed to pass this respective quantity of material. The pasty substances are then injected, in this time sequence: First, the substance of high coercive force is injected in the trailing end; thereafter, the substance of high remanence is injected. The shift, with respect to time, is desirable so that the high remanence material is not pressed at the trailing end, and to provide for junctions which extend approximately radially, or as close to radially as possible.

After the substances are injected, under pressure, in the mold, the molded form is dehydrated and pressed. The ferrite particles are then oriented in a magnetic field. After pressing, the elements are again demagnetized, sintered at between 1200° to 1250° C and are finally ground, as is customary when making sintered magnet structures. The resulting composite shows that it is essentially a unitary body, the connection between the two substances 1, 2 is continuous, so that they merge into each other, and no seam, or joint can be discovered. Grinding does not indicate any difference in materials from one magnet substance to the other either, and the appearance of the magnet structure is entirely uniform; it is not visually apparent that the magnet structure is not made of a single material.

It is also possible to construct a composite magnet in which the segmental portions are separately made and are then joined together, before, or after grinding. Such a method of manufacture, in which the specific segmental parts are separately made and then joined, is suitable when magnets for larger motors are made, that is, when permanent magnet fields are constructed which are of larger sizes than those customary in small fractional horsepower, miniature, or subminiature dynamo electric machines, specifically motors.

The segmental magnet structures are particularly useful in d-c motors hving permanent magnet fields, and especially for miniature and sub-miniature motors. They are useful, however, also in automotive-type starters, or starters in general for internal combustion engines, as magnet structures for magnetos, and magneto-ignition magnets for use with ignition-type internal combustion engines. These magnet structures are less noisy, they decrease the weight per unit power output and are better resistant to demagnetization conditions. They also provide output with better regulation, that is, they are less dependent on loading on the dynamo electric machine. The segmental magnet structure also permits use of a greater air gap in motors which, otherwise, have the same dimensions as motors of the prior art.

In FIG. 3, reference numeral 10 generally indicates a fly wheel dynamo magnetic ignition unit for a motor vehicle, such as a snow mobile. Such a unit is provided with a plurality of magnet structures 11, each one of them being the composite structure illustrated in FIG. 1, and having the magnet portions 1 and 2, and forming segmental arcs. The magnets 11, being permanent magnets and of the structure of FIG. 1, are uniformly spaced from each other about the periphery of a fly wheel 12. An ignition armature 13 is located within the fly wheel to provide ignition energy for an internal combustion engine (not shown). Although the present invention will be described in connection with snow mobiles and the like, it is merely illustrative and not intended to limit the application of the present invention to those motor vehicles. A charging armature 14 is located within the fly wheel 12 to provide a source of energy to a lighting circuit, as well as to a storage battery of the vehicle.

The ignition armature 13 carries a primary winding 16 and a secondary winding 17. The primary winding 16 is connected at one terminal to the circuit reference point, or circuit ground or chassis, and is connected at the other terminal with a secondary winding 17, as well as with a breaker contact 19, actuated by a rotating cam 18, connected to the crank shaft of the engine. The common, or connecting point between the primary and secondary windings is also connected to an ignition capacitor 20, the other terminal of which is connected to ground or chassis. A conductor 21 is connected over an ignition switch (not shown) to a source of positive voltage, for example the battery of the vehicle, schematically indicated merely by +.

The secondary winding 17 is connected by a spark plug cable 23 to a spark plug 24.

The charging armature 14 has a charging winding 25 wound thereon. The terminals are connected over conductors 26, 27 to a suitable rectifier, connected to charge the vehicle battery (not shown) and forming, for example, the source of positive voltage for terminal 21.

The composite segmental magnets provide a new type or class of permanent magnet d-c motors with minimum weight per unit power output; they have better stability and result in better regulation, that is, in load dependence on operation of the motor; the cost of manufacture of the magnet structures for these motors is practically the same as magnet structures of the prior art.

Suitable ferrite materials, to be used in the structure, of the present invention are described in K. Ruschmeyer, Permanentmagnete und ihre Weiterentwicklung, Valvo Berichte Band XIX, Heft 2, Seite 29–40, September 1974.

With respect to magnetos, in which magnet structures of the present invention are useful, reference is made to U.S. Pat. Nos. 3,808,514; 3,864,621; 3,894,525 and 3,971,977, assigned to the assignee of the present application.

Various changes and modifications may be made within the scope of the inventive concept.

RELATIONSHIPS $$H_{e1} : H_{e2} = (V_1 + V_2) : V_2 \tag{1}$$
$$H_{e1} \approx H_{Gr1} \sim {}_JH_{c1} \tag{2}$$
$$H_{e2} \approx H_{Gr2} \sim {}_JH_{c2} \tag{3}$$
$$ {}_JH_{c1} : {}_JH_{c2} \approx V_{Ges} : V_2 \tag{4}$$
$$\text{with } V_{Ges} = V_1 + V_2 \tag{5}$$
$$ {}_JH_{c1} > {}_JH_{c2} \text{ and } B_{r2} > B_{r1} \tag{5a; 5b}$$
$$\frac{V_R}{V_{Ges}} = \frac{{}_JH_{c(R)}}{{}_JH_{c(K)}} \tag{6}$$
$$V_R = V_{Ges} \cdot \frac{{}_JH_{c(R)}}{{}_JH_{c(K)}} \tag{7}$$
$$V_R' = V_R + \frac{V_{Ges} - V_R}{2} = \frac{V_R + V_{Ges}}{2} \tag{7a}$$
$$V_R = 2V_R' - V_{Ges} \tag{8}$$
$$\frac{2V_R' - V_{Ges}}{V_{Ges}} = \frac{{}_JH_{c(R)}}{{}_JH_{c(K)}} \tag{9}$$
$$\frac{V_R'}{V_{Ges}} = \frac{1}{2}\left(\frac{{}_JH_{c(R)}}{{}_JH_{c(K)}} + 1\right) \tag{10}$$
$$V_R' = \frac{V_{Ges}}{2}\left(\frac{{}_JH_{c(R)}}{{}_JH_{c(K)}} + 1\right)$$

We claim:

1. Magnet structure having a ferrite body forming an extended surface and which is characterized in that it consists, along its surface extent, of at least two zones which are, each, made of a permanently magnetizable ferrite material having magnetic characteristics which differ from each other, one material (2) having a higher remanence, or retentivity ($B_r$) and the other material (1) having a higher coercive force, or coercivity (${}_JH_c$) to form a magnet structure, the magnetic characteristics of which differ along a surface dimension thereof.

2. Magnet structure according to claim 1, for use in a magnetic system of a dynamo electric machine wherein the shape of the structure is at least particular forming a segmental arc;

and wherein the ferrite materials of the respective zones are located, with respect to each other, so that the material essentially centrally located in the segmental arc includes the ferrite material (2) which has the higher remanence ($B_r$) and the ferrite material at at least one of the end zones (1) of the segmental arc is that one having the higher coercivity (${}_JH_c$).

3. Magnet structure according to claim 2, wherein the ferrite material having the higher coercivity is located at the trailing end of the segmental arc of a round field structure, and wherein the leading end of the segmental arc, as well as the central zone thereof, comprise ferrite material having a higher remanence ($B_r$).

4. Magnet structure according to claim 2, wherein the magnet structure comprises a plurality of ferrite materials joined to each other, each ferrite material covering one of said zones to form a composite, joined structure.

5. Magnet structure according to claim 1, wherein the structure is a unitary compound structure, the materials in said zones smoothly merging into each other.

6. Magnet structure according to claim 1, for use in a dynamo electric machine, wherein the magnet structure is shaped to be at least part-circular forming a segmental arc.

7. Magnet structure according to claim 1, for use in an automotive vehicle starter wherein the magnet structure is shaped to be at least part-circular forming a segmental arc.

8. Magnet structure according to claim 1, for use in a magneto to provide ignition energy to an internal combustion engine, wherein the magnet structure is shaped to be at least part-circular forming a segmental arc.

9. Magnet structure according to claim 6, wherein the ferrite materials of the respective zones are located, with respect to each other, so that the material essentially centrally located in the segmental arc includes the ferrite material (2) which has the higher remanence ($B_r$) and the ferrite material at at least one of the end zones (1) of the segmental arc is that one having the higher coercivity ($_jH_c$).

10. Magnet structure according to claim 7, wherein the ferrite materials of the respective zones are located, with respect to each other, so that the material essentially centrally located in the segmental arc includes the ferrite material (2) which has the higher remanence ($B_r$) and the ferrite material at at least one of the end zones (1) of the segmental arc is that one having the higher coercivity ($_jH_c$).

11. Magnet structure according to claim 8, wherein the ferrite materials of the respective zones are located, with respect to each other, so that the material essentially centrally located in the segmental arc includes the ferrite material (2) which has the higher remanence ($B_r$) and the ferrite material at at least one of the end zones (1) of the segmental arc is that one having the higher coercivity ($_jH_c$).

12. Magnet structure according to claim 9, wherein the ferrite material having the higher coercivity is located at the trailing end of the segmental arc of a round field structure, and wherein the leading end of the segmental arc, as well as the central zone thereof, comprise ferrite material having a higher remanence ($B_r$).

13. Magnet structure according to claim 10, wherein the ferrite material having the higher coercivity is located at the trailing end of the segmental arc of a round field structure, and wherein the leading end of the segmental arc, as well as the central zone thereof, comprise ferrite material having a higher remanence ($B_r$).

14. Magnet structure according to claim 11, wherein the ferrite material having the higher coercivity is located at the trailing end of the segmental arc of a round field structure, and wherein the leading end of the segmental arc, as well as the central zone thereof, comprise ferrite material having a higher remanence ($B_r$).

15. Magnet structure according to claim 1, for use in a dynamo electric machine, wherein the shape of the structure is at least part-circular, forming a segmental arc and forming at least part of the magnet field system of a dynamo electric machine;

wherein the ferrite materials of the respective zones are located with respect to each other when used in the dynamo electric machine such that the material which has the higher coercivity ($_jH_c$) is located at the circumferential portion of the segmental arc which is most strongly affected by the quadrature field derived from the armature of the dynamo electric machine in operation of the dynamo electric machine.

16. Magnet structure according to claim 15, wherein the volume of the respective zones of ferrite materials are present in accordance with the relationship:

$$\frac{V_R}{V_{Ges}} = \frac{_jH_{c(R)}}{_jH_{c(K)}}$$

wherein $V_R$ is the volume of the material of high remanence, $V_{Ges}$ is the overall volume of the magnet structure, the index $R$ denotes the material of high remanence, and the index $K$ the material of high coercivity;

and wherein the material having the higher remanence, or retentivity ($B_r$) is located at a central portion of the segmental arc of the magnet structure, and the material having the higher coercive force ($_jH_c$) is located symmetrically at the end portions of the magnet structure adjacent the material (2) having the higher remanence, or retentivity.

17. Magnet structure according to claim 15, wherein the volume of the respective zones of ferrite materials are present in accordance with the relationship $$V_R' = \frac{V_{Ges}}{2}\left(\frac{_jH_{c(R)}}{_jH_{c(K)}} + 1\right)$$

wherein $V_R'$ indicates the volume of the material of higher retentivity; $V_{Ges}$ is the entire volume of the structure; the index $R$ denotes the material of high remanence or retentivity; the index $K$ the material of high coercivity;

and wherein the material of high coercivity is located at one end zone of the segmental arc of the magnet structure.

* * * * *